May 15, 1951     R. FRANK     2,553,409

MOTOR CONTROL SYSTEM

Filed Nov. 15, 1948     4 Sheets-Sheet 1

*INVENTOR.*
RUDOLPH FRANK
BY Otto Moeller
*Attorney*

May 15, 1951  R. FRANK  2,553,409
MOTOR CONTROL SYSTEM
Filed Nov. 15, 1948  4 Sheets-Sheet 3

INVENTOR.
RUDOLPH FRANK
BY Otto Moeller
Attorney

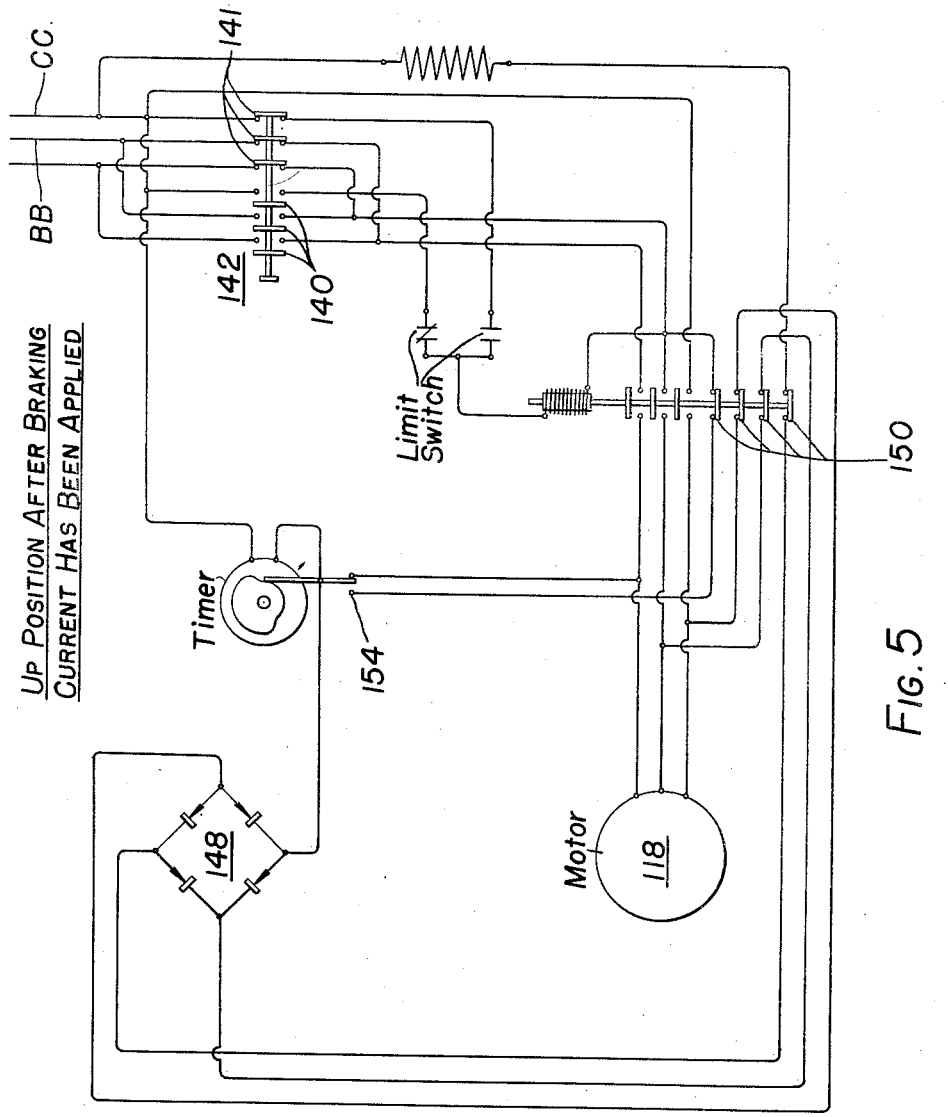

Patented May 15, 1951

2,553,409

UNITED STATES PATENT OFFICE 2,553,409

MOTOR CONTROL SYSTEM

Rudolph Frank, Erie, Pa.

Application November 15, 1948, Serial No. 60,139

9 Claims. (Cl. 318—267)

My invention relates to systems of control for alternating current reversible electric motors for automatically limiting the travel, in opposite directions between predetermined limits, of devices driven by the motor.

Although the invention is not necessarily limited thereto, it has particular application in the control of a motor for a vertical mixer in which a mixing receptacle or bowl is positioned beneath a rotating beater, and wherein the motor is employed for raising and lowering the bowl towards and from the beater.

It has been customary to provide such mixers with push button controls for energizing one or the other of a pair of magnetic starter switches to operate the bowl actuating motor in one direction or the other whereby the bowl may be selectively raised or lowered. Limit switches have been employed at each limit of travel of the bowl for effecting deenergization of a respective starter switch to stop the bowl actuating motor. These limit points are so selected that the bowl when up, is in accurate mixing position, and when down, is in accurate position for easy removal from the bowl saddle. In order to assure reasonably accurate stopping positions of the bowl, regardless of load, a brake type motor is necessary, and it has been the practice to employ a motor having a mechanical brake.

As applied to a system of control for the bowl raising and lowering motor of a vertical mixer, it is an object of the invention to provide a novel and simple arrangement for automatically interrupting the circuit to the bowl actuating motor when the bowl has reached a predetermined upper or lower limit of travel and for simultaneously automatically applying a dynamic braking action on the motor for minimizing overtravel of the bowl. A further object is to provide a system of the type in which the dynamic braking functions only when the motor circuit is interrupted at the limits of travel of the bowl as determined by the limit switches, but does not function when the motor circuit is interrupted at positions of the bowl intermediate its predetermined limits of travel.

The invention contemplates a simplified control system for a motor employed to drive a device in one direction to a first limit and in the opposite direction to a second limit wherein a reversing switch is employed for selectively determining the direction of rotation of the motor, and a single magnetic switch, between the reversing switch and the motor, under the control of a pair of limit switches effects starting of the motor to drive the device toward a limit of travel and stopping of the motor when the device has reached its limit of travel.

The invention further contemplates a new and improved system of dynamically braking a motor through a rectifier under the control of a time delay switch wherein the rectifier is energized only during the actual braking operation.

Other objects and advantages of my invention will be apparent to those skilled in the art from a study of the following description and the drawings forming part of this disclosure.

In the drawings:

Figure 5 is a schematic wiring diagram illustrating a modification of the novel system of control when the bowl is in its extreme up position and after the braking current to the motor has been applied.

Figure 1:
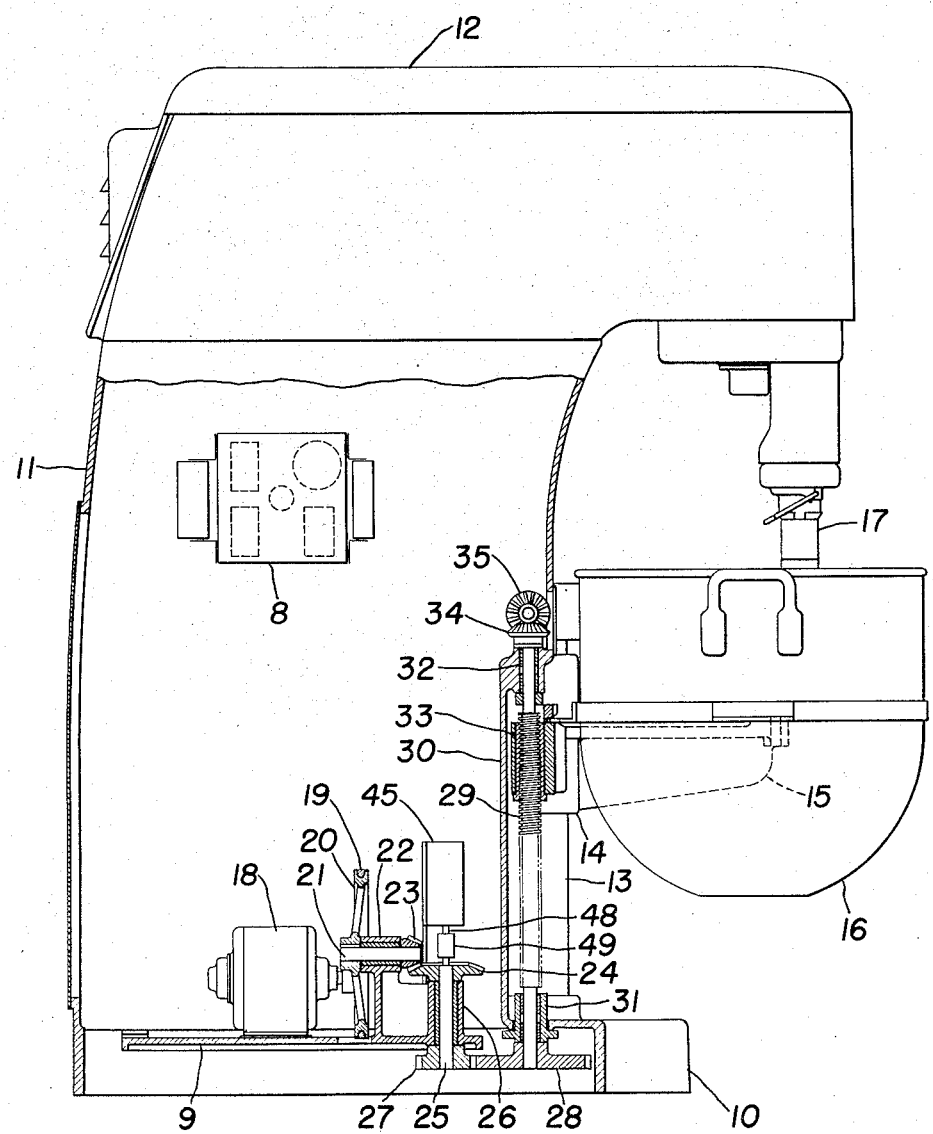
Figure 1 is a view partly in section and partly in side elevation of a vertical mixer provided with power bowl actuating means.

Referring to Figure 1 of the drawings, the mixer comprises a suitable base 10 from which rises a standard 11. A transmission casing 12 surmounts the standard 11 and one end thereof overhangs the base 10. On the corresponding side of the standard 11 are mounted a pair of vertically extending stationary shafts, one of which is shown at 13. These shafts slidably support a yoke 14 which is provided with outwardly extending arcuate arms 15 adapted to receive therebetween a mixing bowl 16.

The bowl 16, and the beater 17 which extends downwardly into the bowl, are shown in their mixing position, or in other words, the bowl 16 is in its elevated or up position. Variable speed operating mechanism for imparting planetary motion to the beater 17, such as shown for example in Patent No. 1,823,571, granted September 15, 1931, or other suitable mechanism for accomplishing the same purpose is mounted in the transmission casing 12. This mechanism constitutes no part of the present invention and further illustration or description thereof is considered unnecessary in the present application.

An alternating current reversible type motor 18 is provided for raising and lowering the bowl 16, and the operating and control mechanism therefor is hereinafter described in detail.

The motor 18 is disposed within the lower portion of the standard 11 and is mounted on a platform 9 secured to the sides of the base 10. For purpose of illustration only, assuming the bowl 16 to be of one hundred quart capacity, a ½ or ⅓ H. P. motor is preferably employed. The motor 18 drives a pulley (not shown) which by means of belt 19 imparts motion to a larger pulley 20 secured on a horizontal shaft 21 journaled in a bearing 22. Mounted on the opposite end of shaft 21 is a bevel gear 23 meshing with a bevel gear 24 secured on the upper end of a vertical shaft 25 journaled in a bearing 26.

Secured on the lower end of shaft 25 is a gear 27 meshing with a larger gear 28 which is secured on the lower reduced portion of a vertical screwthreaded shaft 29. The shaft 29 is disposed centrally between the vertical stationary shafts 13 closely adjacent the front wall 30 of the standard 11 and its reduced lower end portion is journaled in the bearing 31 while its reduced upper end portion is journaled in bearing 32. The pulleys and gear train just described provide a reduction drive for the screwthreaded shaft 29 from the motor 18.

The yoke 14 of the bowl support is provided with an internally threaded bushing 33 which engages the threads of the shaft 29, resulting in raising of the bowl support and bowl upon turning of shaft 29 in one direction and lowering thereof upon turning of shaft 29 in the opposite direction. The reduced upper end portion of the shaft 29 preferably has a bevel gear 34 secured thereon meshing with another bevel gear 35 operatively connected with a handwheel (not shown) for manually raising and lowering the bowl 16.

Figure 2:
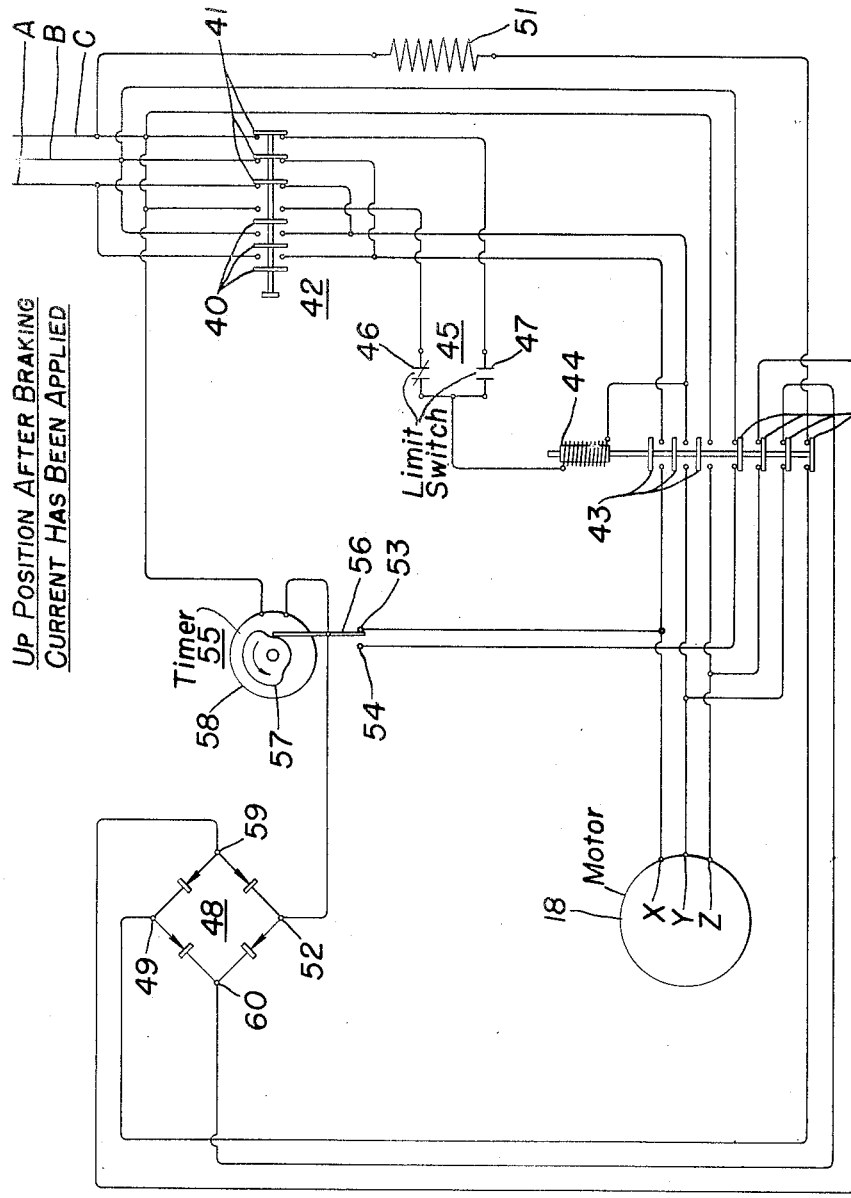
Figure 2 is a schematic wiring diagram illustrating the novel system of control for the bowl actuating means when the bowl is in its extreme up position and after the braking current to the motor has been applied.

Raising and lowering of the bowl 16 by the motor 18 is controlled by a reversing drum switch which is preferably operated by a pivotally mounted handle (not shown) on the control panel 8, though it will be apparent that push buttons or other suitable means may be employed for operating the reversing drum switch. In Figure 2 there is illustrated a wiring diagram of the novel simplified and efficient control system whereby when the bowl reaches a predetermined "up" position, the flow of current to the motor 18 is automatically discontinued and the motor is dynamically braked.

As illustrated, the motor 18 is supplied from the alternating current lines A, B and C through the contactors 40 or 41 of the reversing drum switch 42 depending upon the direction of travel of the bowl 16 desired. As stated above, Figure 2 illustrates the condition of the control system with the bowl 16 in its "up" position as pictured in Figure 1, so that the "up" contactors 41 are closed and the "down" contactors 40 are open.

A switch 43, the operation and control of which, by the relay 44 or equivalent means, will be hereinafter described, is disposed in the circuit to the motor 18 between the reversing drum switch 42 and the motor 18. The contacts of the switch 43 are normally held open by spring means (not shown) or otherwise and interrupt all alternating current line connections to the motor 18.

Figure 3:
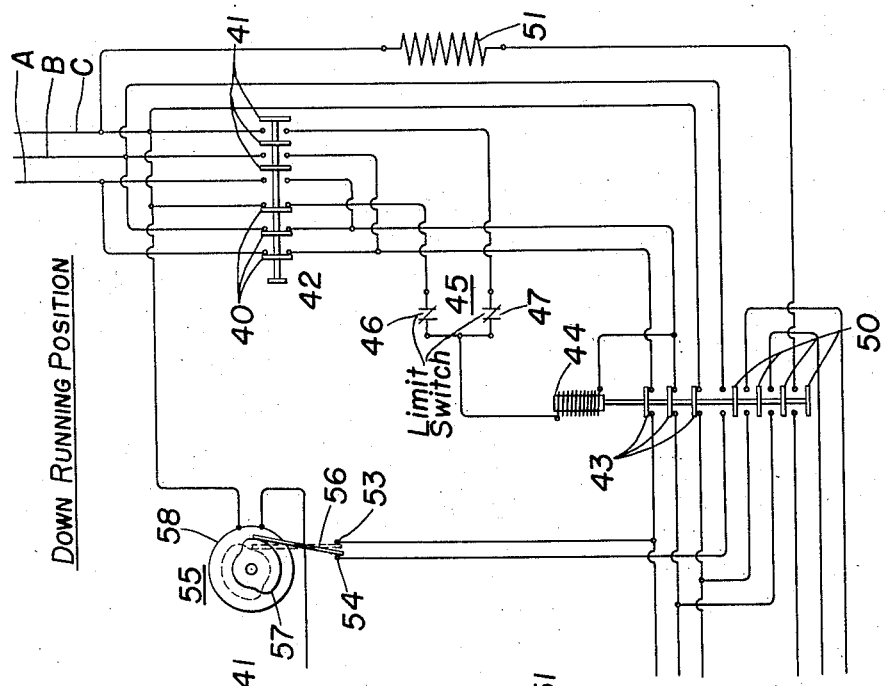
Figure 3 is a schematic wiring diagram of the control system when the bowl is in its running position.

Assuming the contacts of switch 43 to be closed, as shown in Figure 3, which is the down running position of the control system for lowering the bowl 16, then the terminal Z of the motor 18 is connected directly to line C. The terminal X is connected to line A through one of the "down" contactors 40, or alternatively to line B through one of the "up" contactors 41 when the reversing switch is moved to up running position of the control system for raising the bowl 16. Similarly terminal Y is connected to line B through one of the "down" contactors 40, or alternatively to line A through one of the "up" contactors 41. Closing of the "down" contactors 40, it may be assumed, effects operation of the motor 18 to lower the bowl 16, while closing of the "up" contactors 41 effects reverse operation of the motor 18 to raise the bowl 16.

Energization and de-energization of the relay 44 for closing and opening switch 43 is controlled by a limit switch 45 provided with the down limit contact mechanism 46 and the up limit contact mechanism 47. The limit switch 45 may be of any preferred type, such as model #10316-H-50 manufactured by Cutler-Hammer, Milwaukee, Wisconsin. Referring to Figure 1, the operating shaft 48 of the limit switch 45 is rotated by the vertical shaft 25 through a suitable flexible connection 49.

With the bowl 16 in its "up" position as shown in Figure 1, the operation of the control mechanism of Figures 2, 3 and 4 will now be described. To lower the bowl, the operator moves the control handle of the reversing switch 42 to a position closing the "down" contactors 40 and opening the "up" contactors 41, as shown in Figure 3. This completes a circuit from line C through one of the "down" contactors 40, the "down" contact mechanism 46 of limit switch 45 to one side of the coil of the relay 44, and from the other side thereof through another of the "down" contactors 40 to line B, thereby energizing the relay 44 and closing the contacts of switch 43.

As previously described this closes a circuit from the lines A, B and C to the contacts X, Y and Z, respectively, of the motor 18, whereby the screwthreaded shaft 29 is turned in a direction to lower the bowl 16 through the pulley and gear connections previously described. Initial rotation of the operating shaft 48 of limit switch 45 effects resetting of the "up" contact mechanism 47 from the position shown in Figure 2 to the position shown in Figure 3, but since during lowering movement of the bowl 16, the "up" contactors 41 are open, the circuit from line C through the "up" contact mechanism 47 of limit switch 45 is interrupted.

Figure 4:
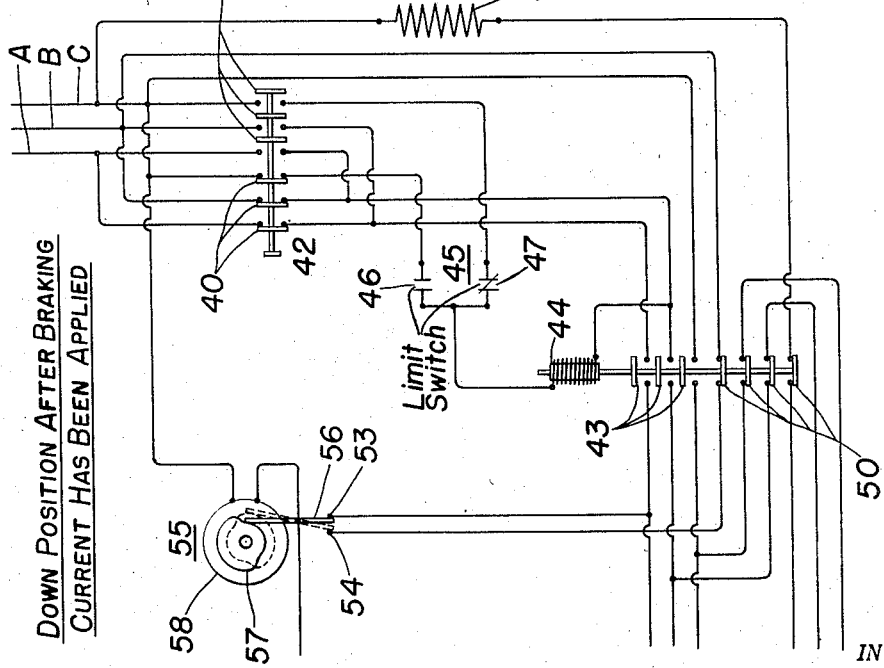
Figure 4 is a schematic wiring diagram of the control system when the bowl is in its extreme down position and after the braking current to the motor has been applied.

At a predetermined lowered position of the bowl 16, the "down" contact mechanism 46 of limit switch 45 opens, thereby breaking the circuit to the relay 44, as shown in Figure 4. De-energization thereof effects opening of the contacts 43 by a spring or other means (not shown) previously referred to, cutting off the power to motor 18.

Now to raise the bowl back into the position shown in Figure 1, the operator moves the control handle of the reversing switch 42 to a position closing the "up" contactors 41 and opening the "down" contactors 40, as shown in Figure 2. This completes a circuit from line C through one of the "up" contactors 41, the "up" contact mechanism 47 of limit switch 45 to one side of the coil of the relay 44, and from the other side thereof through another of the "up" contactors 41 to line A, thereby energizing the relay 44 and closing the contacts of switch 43.

As previously described this closes a circuit from the lines A, B and C to the contacts Y, X and Z, respectively, of the motor 18, whereby the screwthreaded shaft 29 is turned in the opposite direction or in a direction to raise the bowl 16 through the pulley and gear connections previously described. Initial rotation of the operating shaft 48 of limit switch 45 effects resetting of the "down" contact mechanism 46, but since during raising movement of the bowl 16, the "down" contactors 40 are open, the circuit from line C through the "down" contact mechanism 46 of limit switch 45 is interrupted.

At a predetermined raised position of the bowl 16, the "up" contact mechanism 47 of limit switch 45 opens, thereby breaking the circuit to the relay 44. De-energization thereof effects opening of the contacts of switch 43, again cutting off the power to motor 18.

In order to prevent overtravel of the bowl 16 beyond certain predetermined limits after the alternating current circuit to the motor 18 has been interrupted in response to the limit switch contact mechanism 46 or 47, a novel automatic dynamic braking arrangement is incorporated in the control system.

The dynamic braking action is obtained through a full wave rectifier 48 of any suitable type such, for example, as a copper oxide rectifier. The A. C. terminal 49 of rectifier 48 is connected with alternating current supply line C through one of the contacts of the brake control switch 50 and through the resistance 51. The brake control switch 50 is preferably operated by the same relay 44 that operates the switch 43, and is arranged to close when switch 43 opens and to open when switch 43 closes.

The A. C. terminal 52 of rectifier 48 is adapted to be selectively connected with one or the other of contacts 53 and 54 by a timer mechanism 55 which includes the pivotally mounted switch arm 56 responsive to the timer cam 57 operated by the timer motor 58. The contact 54 is connected with alternating current supply line B through one of the contacts of the brake control switch 50 while contact 53 is connected through one of the contacts of switch 43 to alternating current supply line B when the "up" contactors 41 of the reversing switch 42 are closed and to alternating current supply line A when the "down" contactors 40 are closed.

The D. C. terminal 59 of the rectifier 48 is connected with terminal Z of motor 18 through one of the contacts of brake control switch 50 and D. C. terminal 60 is connected with motor terminal Y through another of the contacts of brake control switch 50.

Now, in operation, assuming again we start with the conditions as shown in Figures 1 and 2, to lower the bowl 16, the operator moves the control handle of the reversing switch 42 to a position closing the "down" contactors 40 and opening the "up" contactors 41 of reversing switch 40, as shown in Figure 3, whereby as previously explained, relay 44 is energized, causing the contacts of switch 43 to close and the contacts of brake control switch 50 to open.

While this closes the alternating current line to A. C. terminal 52 of rectifier 48, the simultaneous opening of brake control switch 50 interrupts the alternating current line to the other A. C. terminal 49, and no current passes to the rectifier 48. However, the circuit to the timer motor 58 is completed, and the motor 58 continues to run until the high part of the cam 57 contacts the pivotally mounted switch arm 56, or in other words the motor will run while the cam is moving from the position shown in dotted lines in Figure 3 to the position shown in full lines, whereupon switch arm 56 moves from the dotted line position to the full line position and its conection with contact 53 is broken, and the timer motor 58 stops with the timer mechanism set in its braking position.

As previously described, when the bowl reaches a predetermined lowered position, the "down" contact mechanism 46 of limit switch 45 opens, as shown in Figure 4, thereby causing the relay 44 to become de-energized, and causing the switches 43 and 50 to assume the position shown in Figure 4. The circuit to the motor 18 is broken and simultaneously the circuit to the A. C. terminals 49 and 52 of the rectifier 48 is completed, as also is the circuit to the timer motor 58, and also the direct current circuit from the D. C. terminals 59 and 60 of rectifier 48 to the motor 18.

Application of direct current to the motor 18 effects a braking action and the duration of such application of direct current is determined by the speed of the timer motor 58 and the length of the high part of the timer cam 57. In the present embodiment of the invention, with a ⅓ H. P. motor, a duration of ⅔ of a second has been found ample, though of course, this may be altered to satisfy variable conditions imposed by other applications of the invention. This time of ⅔ of a second is 200% of that actually required to brake the motor within very closely defined limits to guard against any possible drifting of the timer motor 58.

As soon as the pivotally mounted switch arm 56 leaves the high part of the timer cam 57, or in other words, when the timer cam 57 has moved from the dotted line position in Figure 4 to the full line position, the circuit through contact 54 is of course broken, and the arm 56 returns to the full line position shown in Figure 4. The The circuit to the timer motor 58 being broken, it follows that the motor 58 stops, and the circuit to the A. C. terminals of the rectifier 48 being broken, it follows that passage of direct current to the motor 18 is interrupted. Since alternating current is applied to the rectifier 48 for only the very short braking period, it is apparent that a comparatively small rectifier may be employed, and in fact may be overloaded beyond its rated capacity without deleterious effects.

The cycle of operation described above is, of course, repeated when the reversing switch 42 is moved to a position for raising the bowl 16.

While the novel dynamic braking system has been described with reference to a particular application thereof, it is evident that it may be employed to brake any alternating current motor that does not require holding power after stopping.

In Figure 5 is shown a modification of the control system. Referring to the first form of the invention, it will be noted that if the reversing switch 42 is moved to open both the "up" and "down" contactors 41 and 40 during the running position of the bowl—the control system during such running position being as shown in Figure 3—then the circuit to the motor 18 is interrupted, as is also the circuit to the relay 44. Thereupon, the switch 43 opens and the brake switch 44 closes, and as previously explained a circuit is completed from lines B and C to the rectifier and direct braking current is applied to the motor.

In the modified arrangement, if the motor circuit is interrupted during the running position of the bowl by moving the reversing switch 142 to a position opening both the "up" and "down" contactors 141 and 140, direct braking current is not applied to the motor 118 since the circuit from lines BB and CC to the rectifier 148 is not completed. This will become apparent from a comparison of Figures 3 and 5. In Figure 5, the line from contact 154 through the brake control switch 150 leads to the supply line through the reversing switch 142 in place of leading directly to the supply line around the reversing switch as in the case of the arrangement shown in Figure 3.

While the invention has been shown and described as applied to a power operated bowl raising and lowering mechanism, it will be apparent that the invention is adapted for application to a great variety of uses without departing from the spirit thereof.

I claim:

1. In a control system for driving a device in opposite directions to given limits, an alternating current source of supply, an alternating current motor in circuit with said alternating current source of supply, a limit switch at each limit of travel of said device, dynamic braking means for said motor including a rectifier having its input terminals in circuit with said source of alternating current supply and its output terminals in circuit with said motor, and relay means connected to the alternating current source of supply responsive to said limit switches controlling substantially simultaneous opening of said motor circuit and closing of said rectifier circuits and substantially simultaneous closing of said motor circuit and opening of said rectifier circuits.

2. In a control system for driving a device in opposite directions to given limits, an alternating current source of supply, an alternating current motor in circuit with said alternating current source of supply, a limit switch at each limit of travel of said device, dynamic braking means for said motor including a rectifier having its input terminals in circuit with said source of alternating current supply and its output terminals in circuit with said motor, relay means connected to the alternating current source of supply responsive to said limit switches controlling substantially simultaneous opening of said motor circuit and closing of said rectifier circuits, and timer mechanism for rendering said rectifying means ineffective after a predetermined interval of time.

3. In a control system for driving a device in opposite directions to given limits, a reversible alternating current motor, an alternating current source of supply, a circuit connecting said source with said motor, a reversing controller in said motor circuit for selectively effecting operation of the motor in opposite directions, means for providing rectified current from said alternating current source for braking said motor, a limit switch at each limit of travel of said device, and a switch for opening said motor circuit independently of said reversing controller and substantially simultaneously rendering said rectifying means effective upon the operation of either of said limit switches.

4. In a control system for driving a device in opposite directions to given limits, a reversible alternating current motor, an alternating current source of supply, a circuit connecting said source with said motor, a reversing controller in said motor circuit for selectively effecting operation of the motor in opposite directions, means for providing rectified current from said alternating current source for braking said motor, a limit switch at each limit of travel of said device, a switch for opening said motor circuit independently of said reversing controller and substantially simultaneously rendering said rectifying means effective upon the operation of either of said limit switches, and timer mechanism under the control of said last named switch for rendering said rectifying means ineffective after a predetermined interval of time.

5. A control system for driving a device in opposite directions to given limits comprising a reversible alternating current motor, a source of alternating current, a circuit connecting said source with said motor, a reversing controller in said circuit for selectively effecting operation of the motor in opposite directions, a switch between said reversing controller and said motor, dynamic braking means for said motor including a rectifier, a circuit connecting the input terminals of said rectifier with said alternating current source of supply and a circuit connecting the output terminals of said rectifier with said motor, a switch in said rectifier circuits, a limit switch at each limit of travel of said device, and relay means responsive to operation of either of said limit switches for substantially simultaneously opening said first named switch and closing said rectifier control switch.

6. A control system for driving a device in opposite directions to given limits comprising a reversible alternating current motor, an alternating current source of supply, a circuit connecting said source with said motor, a gang switch in said motor circuit for selectively effecting operation of the motor in opposite directions, dynamic braking means for said motor including a rectifier, a circuit connecting the input terminals of said rectifier with said alternating current source of supply and a circuit connecting the output terminals of said rectifier with said motor, a switch in said motor circuit and said rectifier circuits, a control circuit for said last named switch controlled by said gang switch for simultaneously completing the circuit to the motor for operation in the direction determined by said gang switch and interrupting said rectifier circuits, and limit switch mechanism in said control circuit responsive to travel of said device to either of its limits for making said last named switch open the circuit to said motor and close said rectifier circuits.

7. In a control system for a motor utilized to drive a device in one direction to a first limit and in the opposite direction to a second limit, a reversing controller for selectively effecting operation of the motor in opposite directions, a single electromagnetic switch between said reversing controller and said motor, a limit switch controlling said electromagnetic switch to initially start the motor for driving the driven device toward said first limit and to stop the motor when the driven device has reached said first limit, and a second limit switch controlling said electromagnetic switch to initially start the motor for driving the driven device toward said second limit and to stop the motor when the driven device has reached said second limit.

8. A control system for driving a device in opposite directions to given limits comprising a reversible alternating current motor, an alternating current source of supply, a circuit connecting said source with said motor, a reversing switch in said motor circuit for selectively effecting operation of the motor in opposite directions, an electromagnetic switch in said motor circuit between said reversing switch and said motor, a circuit for said electromagnetic switch controlled by said reversing switch to complete the circuit to the motor for operation in the direction determined by said reversing switch, and limit switch mechanism in said electromagnetic switch circuit responsive to travel of said device to either of its limits for rendering said electromagnetic switch ineffective for completing the circuit to said motor.

9. In a motor control system, an alternating current motor, a source of alternating current, a circuit connecting the motor with the source of alternating current, a rectifier, a circuit connecting the input terminals of said rectifier with said source of alternating current, a circuit connecting the direct current output terminals of said rectifier with said motor, timer mechanism including a motor, a circuit connecting said timer motor with said source of alternating current, a switch adapted for simultaneously opening the alternating current circuit to said first named motor, closing the direct current circuit to said first named motor, closing the circuit to said timer motor and closing the circuit to the input terminals of said rectifier whereby the first named motor is dynamically braked, a cam operated by said timer motor and a switch responsive to said cam arranged to open the circuit to said timer motor and the circuit to the input terminals of said rectifier after a predetermined interval of time to interrupt flow of direct current to said first named motor.

RUDOLPH FRANK.

REFERENCES CITED

The following references are of record in the file of this patent:

UNITED STATES PATENTS

| Number | Name | Date |
|---|---|---|
| 1,406,377 | Harvey | Feb. 14, 1922 |
| 1,911,356 | Eames | May 30, 1933 |
| 2,242,812 | Brown | May 20, 1941 |